United States Patent [19]

Towle

[11] Patent Number: 4,841,013

[45] Date of Patent: * Jun. 20, 1989

[54] PREPARATION OF POLY(ARYLENE ETHER KETONES)

[75] Inventor: Ian D. H. Towle, Cirencester, England

[73] Assignee: Raychem Limited, London, England

[*] Notice: The portion of the term of this patent subsequent to Jun. 20, 2006 has been disclaimed.

[21] Appl. No.: 96,415

[22] Filed: Sep. 11, 1987

[30] Foreign Application Priority Data

Sep. 18, 1986 [GB] United Kingdom ............... 8622475
Oct. 8, 1986 [GB] United Kingdom ............... 8624172

[51] Int. Cl.$^4$ .................. C08G 8/02; C08G 14/00
[52] U.S. Cl. .................. 528/125; 528/126; 528/128; 528/222; 528/223; 528/224; 528/225; 525/242; 525/280; 525/309
[58] Field of Search ............. 528/125, 126, 128, 222, 528/223, 224, 225; 525/242, 280, 309

[56] References Cited

U.S. PATENT DOCUMENTS

| | | | |
|---|---|---|---|
| 3,442,857 | 6/1969 | Thornton | 528/125 |
| 4,396,755 | 7/1983 | Rose | 528/126 |
| 4,698,393 | 10/1987 | Jansons et al. | 525/242 |
| 4,709,007 | 11/1987 | Jansons et al. | 528/222 |
| 4,721,771 | 1/1988 | Jansons et al. | 528/222 |

FOREIGN PATENT DOCUMENTS

| | | |
|---|---|---|
| 63874 | 11/1982 | European Pat. Off. . |
| 1383393 | 2/1975 | United Kingdom ............ 528/125 |
| 2168064 | 6/1986 | United Kingdom . |

OTHER PUBLICATIONS

Fieser & Fieser, *Advanced Organic Chemistry*, pp. 649–653 (Reinhold 1961).

*Primary Examiner*—Morton Foelak
*Assistant Examiner*—M. L. Moore
*Attorney, Agent, or Firm*—Yuan Chao; Edith A. Rice; Herbert G. Burkard

[57] ABSTRACT

Friedel Crafts preparation of arylene ether ketone polymers with an exceptionally high degree of isomeric purity and freedom from by-products can be achieved by adding to the Lewis acid reaction system a protic controlling agent selected from ROX, water, RCOOX, RSO$_3$X, and ROY, wherein R is organic, X is hydrogen or metal, and Y is metal. Contrary to conventional expectation, the protic agent does not significantly acylate or alkylate the polymer, and agents of relatively low molecular weight, e.g. benzoic acid, can be selected to produce dispersions of the resulting polymers. The controlling agent also apparently acts to maintain the polymer in solution until a desired molecular weight is reached.

22 Claims, No Drawings

PREPARATION OF POLY(ARYLENE ETHER KETONES)

This invention relates to a method of preparing poly(arylene ketones) and in particular to an electrophilic polymerisation process for preparing such polymers.

Poly(arylene ketones), in particular, all para-linked poly(aryl ether ketones), possess many desirable properties, for example, high temperature stability, mechanical strength, and resistance towards common solvents. This invention is directed to an improved electrophilic synthesis for preparing poly(arylene ketones), in particular para-linked poly(aryl ether ketones).

In an electrophilic synthesis, the polymerisation step involves the formation of an aryl ketone group from a carboxylic acid or acid derivative group and an aromatic compound containing an aromatic carbon bearing an activated hydrogen atom, i.e., a hydrogen atom displaceable under the electrophilic reaction conditions. The monomer system employed in the polymerisation can be, for example, (a) a single aromatic compound containing both a carboxylic acid or acid derivative group as well as an activated hydrogen atom on an aromatic carbon for example, p-phenoxybenzoyl chloride; or (b) a two-component system of a dicarboxylic acid or acid derivative and an aromatic compound containing two activated hydrogen atoms, for example, 1,4-diphenoxybenzophenone and terephthaloyl chloride.

Electrophilic polymerisation of this type is often referred to as Friedel-Crafts polymerisation. Typically, such polymerisations are carried out in an anhydrous reaction medium comprising the reactant(s), a catalyst, such as anhydrous aluminium trichloride, and solvent such as methylene chloride, carbon disulfide, nitromethane, nitrobenzene, or ortho-dichlorobenzene, or mixtures thereof. Because the carbonyl groups of the reactant(s) and products complex with aluminium trichloride and thereby deactivate it, the aluminium trichloride catalyst is generally employed in an amount greater than one equivalent for each equivalent of carbonyl groups in the reaction medium. Other inorganic halides such as ferric chloride, may be employed as the catalyst.

Such Friedel-Crafts polymerisations generally have produced an intractable reaction product difficult to remove from the reaction vessel and purify. Further, such processes have tended to produce polymer of undesirably low molecular weight and/or of poor thermal stability. The all para-linked poly(arylene ether ketones) have been particularly difficult to prepare under such Friedel-Crafts conditions. One factor that appears to contribute to the unsatisfactory results reported in the literature is that the para-linked polymers are more highly crystalline than the ortho, meta or mixed isomeric members of this polymer family and are therefore generally more insoluble in the reaction media typically used in such Friedel-Crafts reactions. This tends to result in the premature precipitation of the polymer in low molecular weight form. Another factor that may lead to these poor results is deactivation of the terminal aryloxy groups by complexation with aluminium chloride or alkylation of the terminal group which prevents further growth of the polymer chain. Also, side reactions, particularly at the ortho position of activated aromatic rings can result in a polymer that is branched and/or is more likely to cross-link at elevated temperatures such as those required for melt processing the polymer. It is generally recognized that in Friedel-Crafts reactions, ortho substitution of the polymer is more likely to occur if the reaction is conducted at elevated temperatures and/or for a relatively long reaction time.

U.S. Pat. Nos. 3,065,205; 3,767,620; 3,516,966; 3,791,890 and 4,008,203, and U.K. patent Nos. 971,227 and 1,086,021 disclose the preparation of poly(arylene ketones) by Friedel-Crafts polymerisation and generally acknowledge some of the difficulties in producing tractable, melt-stable polymers. For example, U.S. Pat. No. 3,791,890 provides a method of producing the polymers in granular form by special treatment of the reaction mixture before gellation can occur and U.S. Pat. No. 3,767,620 provides a method of treating the polymer to reduce undesired end groups which result from side reactions during polymerisation and which cause thermal instability of the polymer.

To overcome the disadvantages encountered in producing poly(arylene ketones) by the above described Friedel-Crafts polymerisation, it has been proposed to use boron trifluoride catalyst in anhydrous hydrogen fluoride. See for example, U.S. Pat. Nos. 3,441,538; 3,442,857; 3,953,400 and 3,956,240. This general process has been used commercially to produce polymer of the desired high molecular weight and thermal stability. However, the use of boron trifluoride and hydrogen fluoride requires special techniques and equipment making this process difficult to practice on a commercial scale.

In European Published Patent Application No. 0124276 an electrophilic process is described which alleviates the disadvantages described above and does not require the special techniques and equipment necessary when boron trifluoride and hydrogen fluoride are used. In this method a Friedel-Crafts polymerisation reaction is carried out under controlled or moderated conditions using a Lewis acid catalyst such as aluminium trichloride. In one embodiment the method includes the use of a Lewis base as a controlling agent. This controlling agent generally maintains the polymer in solution or in a swollen gel form in which polymerisation to a high molecular weight polymer can take place. It also acts to suppress undesirable side reactions, particularly ortho substitution of the aromatic rings in the polymer backbone, so that an essentially linear polymer is produced. Furthermore the process provides a high reaction rate which enables the reaction to be carried out at relatively low temperatures over a relatively short period of time. Since that process maintains the polymer in solution or in a more tractable state, recovery and purification of the polymer is greatly facilitated.

One criterion for choosing the controlling agent in this process is that it should not be an acylating or alkylating agent, nor should it be acylatable under the reaction conditions. It is known that protic compounds act as acylating or alkylating agents in Friedel-Crafts reactions in the presence of aluminium trichloride.

However, it has now been surprisingly discovered that such compounds may be used as controlling agents in the process without themselves participating significantly in the acylation or alkylation, reaction. Furthermore, it has been found that some of these controlling agent compounds will also act as dispersants to produce the poly(arylene ether ketones) in a conveniently dispersed state, despite the compounds having fewer than the minimum of 8 aliphatic carbon atoms disclosed for long-chain dispersants in European Published Patent Application No. 0174207. Carboxylic acids, e.g. succinic acid and benzoic acid, have proved particularly useful in this respect. It cannot be reliably predicted whether a particular controlling agent will act as a dispersant, since this appears to depend on the other materials present and their relative properties and reaction conditions, but the dispersant effect is readily recognised (and reproduced once recognised) by suitably skilled operators. It has also been discovered that water can be added as the controlling agent, contrary to the well-known requirement for substantially anhydrous conditions in Friedel-Crafts reactions.

Accordingly the present invention provides in one aspect a method of preparing a poly(arylene ether ketone) having the repeat unit:

—Ar—O—Ar—CO— where each Ar is independently a substituted or unsubstituted phenylene moiety or a substituted or unsubstituted polynuclear moiety, aromatic carbon atoms of which are bonded directly to the —O— or —CO— groups, which comprises polymerising a monomer system comprising (I) phosgene or an aromatic or aliphatic diacid dihalide monomer and a polynuclear aromatic comonomer having two activated hydrogens or (II) a self-polymerising polynuclear aromatic monomer containing both an acid halide group and an active hydrogen atom, in a reaction medium comprising:

(A) a Lewis acid;
(B) a controlling agent comprising:
  (i) $R(OX)_a$ or added water which must be present in the reaction medium together with the Lewis acid before any monomer containing acid halide groups is added,
  (ii) $R(COOX)_a$,
  (iii) $R(SO_3X)_a$, or
  (iv) $(RO)_b Y$, which, if the Y—O linkage(s) are reactive to acid halide groups, must be present in the reaction medium together with the Lewis Acid before any monomer containing acid halide groups is added,
  where
    R is a monovalent or polyvalent organic group compatible with the monomer(s) and the other components of the reaction medium,
    each X independently is a hydrogen atom or a monovalent metal atom,
    each a independently is 1 or 2,
    Y is a multivalent metal atom, and
    b is an integer equal to the valency of Y; and
(C) optionally a non-protic diluent;

the various components being present in such proportions and the polymerisation being conducted under such reaction conditions that a thermally stable, substantially linear poly(arylene ether ketone) substantially free of pendant groups resulting from ortho substitution of para-linked aromatic rings in the polymer backbone is obtained *either* in a dispersed state, in which case the group R of the controlling agent (B) has fewer than 8 aliphatic carbon atoms directly bonded to one another, *or* in a solution or gel state.

In a second aspect the present invention provides a method of producing a poly(arylene ether ketone) which comprises polymerising a monomer system comprising:
(I)
  (i) phosgene or an aromatic or aliphatic diacid dihalide monomer and:
  (ii) a polynuclear aromatic comonomer comprising:
    (a) H—Ar—O—Ar—H
    (b) H—$(Ar—O)_n$—Ar—H wherein n is 2 or 3
    (c) H—Ar—O—Ar—(CO—Ar—O—$^{Ar}$)$_m$—H 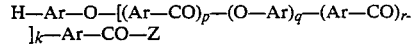
       wherein m is 1, 2 or 3 or
    (d) H—$(Ar—O)_n$—Ar—CO—Ar—$(O—Ar)_m$—H wherein m is 1, 2 or 3, and n is 2 or 3 or
(II) a self-polymerising acid halide monomer of the formula H—Ar—O—[(Ar—CO)$_p$—(O—Ar)$_q$—(Ar—CO)$_r$—]$_k$—Ar—CO—Z wherein Z is halogen, k is 0, 1 or 2, p is 1 or 2, q is 0, 1 or 2 and r is 0, 1 or 2; or (III) a self-polymerising acid halide monomer of the formula:

H—$(Ar—O)_n$—Ar—Y wherein n is 2 or 3 and Y is CO—Z or CO—Ar—CO—Z; where Z is halogen;
  wherein each Ar is independently selected from substituted or unsubstituted phenylene, and substituted and unsubstituted polynuclear aromatic moieties the end one of the aromatic moieties being activated to electrophilic attack e.g., by an ether linkage to the next moiety;
in a reaction medium comprising
(A) a Lewis acid in an amount of about one equivalent per equivalent of carbonyl groups present in the monomer system plus about one equivalent per equivalent of controlling agent, plus an amount effective to act as a catalyst for the polymerisation;
(B) a controlling agent, in an amount from 0.25 to 4 equivalents per equivalent of acid halide groups present in the monomer system, comprising:
  (i) $R(OX)_a$ or added water which must be present in the reaction medium together with the Lewis acid before any monomer containing acid halide group is added,
  (ii) $R(COOX)_a$,
  (iii) $R(SO_3X)_a$, or
  (iv) $(RO)_b Y$, which, if the Y—O linkage(s) are reactive to acid halide groups, must be present in the reaction medium together with the Lewis Acid before any monomer containing acid halide groups is added,
  where
    R is an organic group compatible with the monomer(s) and the other components of the reaction medium and, when the poly (arylene ether ketone) is produced in a dispersed state, has fewer than 8 aliphatic carbon atoms directly bonded to one another,
    each X independently is a hydrogen atom or a monovalent metal atom,
    each a independently is 1 or 2,
    Y is a multivalent metal atom; and
    b is an integer equal to the valency of Y; and
(C) a non-protic diluent in an amount from 0 to about 93% by weight, based on the weight of the total reaction mixture.

Thus the process of the present invention enables substantially linear poly(arylene ether ketones) of high molecular weight to be prepared using as a controlling agent a generally cheap and easily available compound (or compounds) which is relatively non-hazardous.

It will be readily understood that the group R in the controlling agent (B) is compatible with the monomer(s) and the other components of the reaction medium in the sense that it does not unacceptably interfere with the reaction. Provided that is so, R may be any desired monofunctional or (where appropriate) difunctional aliphatic aromatic or heterocyclic group, for example a substituted or unsubstituted alkyl, alkylene, aryl, arylene, alkaryl or aralkyl group. Simple aliphatic or aromatic groups are preferred, especially alkyl and alkylene groups, preferably n-alkyl and n-alkylene groups, and phenyl or naphthyl groups or phenylene or naphthylene groups.

Where the controlling agent is of the formula $R(OX)_a$ as defined above, the controlling agent may be an alcohol ROH, which also includes diols HOROH, or an organic metal oxide where X is, for example, an alkali metal such as sodium. In view of their strong affinity for reaction with acid halide groups, it is surprising that alcohols can be used as the controlling agent, even with the specified order of addition to the reation mixture, which unexpectedly prevents reaction with the acid halide. Unbranched alcohols, e.g. n-alkanols, are preferred, especially the n-lower alkanols, e.g. n-butanol.

Where the controlling agent is of the formula $R(COOX)_a$ as defined above, this may be a carboxylic acid R—COOH, which includes dicarboxylic acids XOOC—R—COOX, or metal salts thereof where X is, for example an alkali metal.

Where the controlling agent is of the formla $(R-O)_b Y$, Y is preferably a di- or trivalent metal atom and b is 2, 3 or 4 respectively e.g. $(RO)_3Al$, $(RO)_4Ti$, $(RO)_2Zn$.

Preferably R is a substituted or unsubstituted aryl group, or linear or branched alkyl group, or their arylene or alkylene equivalents where appropriate. More preferably R is an unsubstituted alkyl group especially a $C_1$-$C_5$ alkyl group, e.g. a methyl, ethyl, propyl, isopropyl, n-butyl or isobutyl group; or an unsubstituted aryl group, e.g. a phenyl or naphthyl group, and preferably aryl R groups are deactivated to electrophilic attack by attachment of electron-withdrawing groups.

It is also preferred that the controlling agents have fewer than 8 aliphatic carbon atoms, or even fewer than 5 aliphatic carbon atoms, directly bonded to one another, this including the possibilities that only one or no aliphatic carbon atoms are present, or that fewer than the stated numbers of such atoms are present in any one group, in the controlling agent molecule.

More specific examples of suitable controlling agents include methanol, ethanol, isopropanol, butanol, acetic acid, propionic acid, butanoic acid, trichloroacetic acid, trifluoroacetic acid, methane sulphonic acid, succinic acid, sodium methoxide, sodium ethoxide, $(CH_3CH_2O)_3Al$, $(CH_3COO)_3Al$, pentafluorophenol, and benzoic acid. It appears that trifluoroacetic acid may have the useful ability to produce a very fast reaction, or alternatively to reduce the amount of aluminium chloride needed for a given reaction speed possibly because the electron-withdrawing effect of the fluorine atoms produces a more highly charged aluminium atom in the resulting Lewis acid/controlling agent complex.

Mixtures of two or more controlling agents may be used if desired, and mixtures of the controlling agent(s) with the Lewis base controlling agents described in the aforementioned European Patent Application No. 0124276 (whose disclosure is incorporated herein by reference) may help to dissolve or disperse otherwise intractible products. Methanol controlling agent plus sulpholane Lewis base is one example of such a mixture.

As mentioned above, the controlling agent acts, inter alia, to suppress undesirable side reactions, particularly ortho substitution of the aromatic rings in the monomer system. It is believed that the aromatic rings which are particularly susceptible to ortho substitution are active aryloxy groups. Such groups are referred to herein as undeactivated aryloxy groups. By "undeactivated aryloxy group" is meant an aryloxy group which is in a molecule in which there are no deactivating groups or is located at least two aromatic moieties (i.e. Ar as defined above) away from a deactivating group such as a carbonyl. Conversely a "deactivated aryloxy group" is an aryloxy group separated from a deactivating group, usually carbonyl, by an aromatic group containing one aromatic ring, fused aromatic rings or aromatic rings linked by direct bonds. Suppression of side reactions results in a polymer that is thermally stable, that is it does not degrade or cross-link when subjected to elevated temperatures, e.g. temperatures above the melting point of the polymer, for a period of time. For a polymer of this type to be suitable for melt processing, it must be able to withstand the processing temperatures for the required processing time. Typically these conditions require that the polymer can withstand temperatures up to about 30° C. above the melting or softening point of the polymer for periods of at least 30 minutes, preferably at least 60 minutes and most preferably at least 90 minutes, without undesired gel formation or substantial change in inherent viscosity.

The amount of controlling agent present is preferably from 0.1 to 4 equivalents per equivalent of acid halide groups present in the monomer system. Amounts greater than 4 equivalents could be employed, if desired. However, no additional controlling effect is usually achieved by adding larger amounts. Thus, it is preferred to use no more than 4 equivalents, more preferably between 0.5 and 4 equivalents and especially between 0.5 and 2 equivalents per equivalent of acid halide groups. The actual amount of controlling agent added depends upon, inter alia, the particular controlling agent used, the nature of the monomers present and the type and amount of Lewis acid employed.

While it is not understood exactly how the controlling agent acts to control the reaction, it is believed that one or more of the following factors may be involved. It is thought that the controlling agent forms a complex or compound (hereinafter "complex" for simplicity) with the Lewis acid. The complex appears to act as a solvent for the polymer-Lewis acid complex formed during the reaction thereby maintaining the polymer in solution or in a reactive gel state and in some cases producing a dispersion of the resulting polymer. Further, the reaction mixture is more tractable, making work up of the polymer easier and ensuring effective removal of catalyst residues during purification. The solubilization property of the Lewis acid/controlling agent is particularly significant in the preparation of para-linked poly(arylene ether ketones). As mentioned above these polymers are more highly crystalline than other members of this polymer family and their complexes with the Lewis acid tend to precipitate from the reaction medium in low molecular weight form and/or in a particularly intractable mass difficult to recover and purify. Thus, in accordance with the invention, the controlling agent is selected such that, usually in complex form with the Lewis acid, it maintains the resulting poly(arylene ether ketone) in solution, at least until a desired molecular weight is reached, and may conveniently produce a dispersion of the polymer. Whether a controlling agent will maintain the eventual polymer in solution/gel or disperse it can be readily determined by experiment.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. The use of substantially anhydrous aluminum trichloride as the Lewis acid is preferred.

The amount of Lewis acid used in the practice of this invention varies depending on the particular monomers and reaction medium selected. In all instances at least about one equivalent of Lewis acid per equivalent of carbonyl groups present in the monomer system is used plus one equivalent per equivalent of controlling agent used plus an amount effective to act as a catalyst for the polymerisation (also referred to herein as a catalytic amount). Generally a catalytic amount added is from about 0.05 to about 0.5 equivalents of Lewis acid per equivalent of acid halide in the reaction mixture. When aluminium chloride is used as the Lewis acid one equivalent is considered to be $AlCl_3$. Further, if a comonomer containing other basic species, such as sulfone groups, is used, additional Lewis acid may be required.

A non-protic diluent can also be employed, if desired, "non-protic" meaning that the diluent has no hydrogen directly bonded to oxygen or nitrogen. Sucn diluents are also known as "aprotic". Advantageously, the diluent should dissolve the Lewis acid/controlling agent complex and the resulting polymer/Lewis acid complex. It should also be relatively inert toward Friedel-Crafts reactions. The diluent is preferably somewhat polar as measured by its dielectric constant and solubility parameter. Preferably the dielectric constant of the diluent is at least about 2.0 at 24° C., and preferably in the range of from about 4.0 to about 25 at 24° C. The Hildebrand solubility parameter of the diluent is preferably at least about 7.2 $[cal/cm^3]^{\frac{1}{2}}$ and is preferably in the range of from about 9.2 to about 15 $[cal/cm^3]^{\frac{1}{2}}$. Preferred diluents include, for example, methylene chloride, carbon disulfide, o-dichlorobenzene, 1,2,4-trichlorobenzene, o-difluorobenzene, 1,2-dichloroethane, cyclohexane, 1,1,2,2,-tetrachloroethane and mixtures thereof.

The diluent is used in an amount from 0 to about 93% by weight, based on the weight of the total reaction mixture. As is known in polymerisations of this type, the reactions can be run neat, that is without the presence of a diluent. Typically the diluent is used in an amount of at least about 10%, preferably at least about 20% by weight of the reaction mixtures.

As mentioned above, the monomer system used in the process according to this invention is either (I) phosgene or an aromatic diacid halide monomer and a polynuclear aromatic comonomer preferably reacted together in a stoichiometric ratio of 1:1, or (II) a self-polymerising polynuclear aromatic monomer containing both an acid halide group and an active hydrogen atom.

The term polynuclear aromatic moieties is used to mean aromatic moieties containing at least two aromatic rings. The rings can be fused, joined by a direct bond or by a linking group. In certain monomers, at least two of the aromatic rings are linked by an ether oxygen linkage. Other linking groups which can join aromatic rings in the aromatic moieties include for example, ether, carbonyl, sulfone, sulfide, amide, imide, azo, alkylene, perfluoroalkylene and the like.

The phenylene and polynuclear aromatic moieties contained in the monomers can contain substitutents on the aromatic rings. Such substitutents should not inhibit or otherwise interfere with the polymerisation reaction to any significant extent. Such acceptable substitutents include, for example, phenyl, halogen, ester, nitro, cyano, alkyl and the like.

Where an aromatic diacid dihalide is employed, it is preferably a dichloride or dibromide. Examples of suitable diacid dihalide monomers, polynuclear aromatic comonomers which can be used with such diacid dihalide monomers, and self-polymerising acid halide monomers are described in the aforementioned European Published Patent Application No. 0124276, the disclosure of which is incorporated herein by reference.

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which do not contain an ether linkage can be employed as long as one or more of the monomers used contains at least one ether oxygen linkage, for example Ph—O—Ph—SO—Ph—O—Ph, or Ph—O—Ph—C(CH$_3$)$_2$—Ph—O—Ph, wherein Ph represents a p-phenylene unit, which can be used as the sole monomer with an ether containing diacid dihalide or with phosgene or any diacid dihalide when used in addition to a polynuclear aromatic monomer.

As mentioned above, one of the important features of this invention is that poly(arylene ketones) of high molecular weight can be obtained. By "high molecular weight" is meant polymer having an inherent viscosity greater than about 0.6 (units dl/g understood hereafter). Preferably the polymer prepared by the process of this invention has an inherent viscosity in the range of about 0.6 to about 2.0. Polymers having an inherent viscosity below about 0.6 are generally not useful because they have poor mechanical properties, such as tensile strength and elongation. They also tend to be brittle while polymers having an inherent viscosity above about 2.0 are very difficult to melt process. Throughout this application, inherent viscosity refers to the mean inherent viscosity determined according to the method of Sorenson et al, "Preparative Methods of Polymer Chemistry" Interscience (1968), at page 44 [0.1 g polymer dissolved in 100 ml of concentrated sulfuric acid at 25° C.].

If desired, the molecular weight of the polymer, the degree of branching and amount of gelation can be controlled by the use of, for example, capping agents as described in U.S. Pat. No. 4,247,682, the disclosure of which is incorporated herein by reference. The molecular weight of the polymer can also be controlled by a polymerisation reaction utilizing a two-monomer system as described above, by employing a slight excess of one of the monomers.

The temperature at which the reaction is conducted can be from about −50° C. to about +150° C. It is preferred to start the reaction at lower temperatures, for example at about −50° C. to about −10° C. particularly if the monomer system contains highly reactive monomers. After polymerisation has commenced, the temperature can be raised if desired, for example, to increase the rate of reaction. It is generally preferred to carry out the reaction at temperatures in the range of between about −30° C. and +25° C.

Capping agents, when employed, are added to the polymerisation reaction medium to cap the polymer on at least one end of the polymer chain. This terminates continued growth of that chain and controls the resulting molecular weight of the polymer, as shown by the inherent viscosity of the polymer. Judicious use of the capping agents results in a polymer within a selected narrow molecular weight range, decreased gel formation during polymerisation, and decreased branching of the polymer chains and increases melt stability. Both nucleophilic and electrophilic capping agents may be used to cap the polymer at each end of the chain.

Preferred nucleophilic capping agents are 4-chlorobiphenyl, 4-phenoxybenzophenone, 4-(4-phenoxyphenoxy)benzophenone, biphenyl 4-benzenesulphonylphenyl phenyl ether, and the like.

Typical electrophilic capping agents are compounds of the formula

Ar—CO—E or Ar—SO$_2$—E wherein Ar'' is phenyl, 3-chlorophenyl, 4-chlorophenyl, 4-cyanophenyl, 4-methylphenyl or an aromatic group substituted with an electron withdrawing substitutent and E is halogen or other leaving group. Preferred electrophilic capping agents include benzoyl chloride, benzenesulfonyl chloride and the like.

As mentioned above, a key aspect of this invention is that the Lewis acid/controlling agent complex apparently solubilizes or solvates the polymer so that it remains in the reaction medium in a form capable of sustaining continued polymerisation so that the desired high molecular weight is obtained in a controlled and reproducible fashion either as a solution/gel or as a dispersion. Lewis acid is also present in the reaction medium as the catalyst for the Friedel-Crafts polymerisation reaction. The resulting polymer contains Lewis acid complexed to the carbonyl groups of the polymer. For many polymerisations, the Lewis acid is complexed to substantially all the carbonyl groups in the polymer. As is well known with polymers of this type, the catalyst residue must be removed, i.e the Lewis acid must be decomplexed from the polymer and removed. A method for removing the catalyst residue is described in U.S. Pat. No. 4,237,884 the disclosure of which is incorporated herein by reference.

Decomplexation can be accomplished by treating the polymerisation reaction mixture with a decomplexing base after completion of polymerisation. The base can be added to the reaction medium or the reaction medium can be added to the base. The decomplexing base must be at least as basic towards the Lewis acid as the basic groups on the polymer chain. Such decomplexation should be effected before isolation of the polymer from the reaction mixture.

The amount of decomplexing base used should be in excess of the total amount of bound (complexed) and unbound Lewis acid present in the reaction mixture and is preferably at least twice the total amount of Lewis acid. Typical decomplexing bases which can be used include water, dilute aqueous hydrochloric acid, methanol, ethanol, acetone, N,N-dimethyl-formamide, N,N-dimethylacetamide, pyridine, dimethyl ether, diethyl ether, tetrahydrofuran, trimethylamine hydrochloride, dimethyl sulfide, tetramethylenesulfone, benzophenone, tetramethylammonium chloride, isopropanol and the like. The decomplexed polymer can then be removed by conventional techniques such as adding a nonsolvent for the polymer which is a solvent for or miscible with the Lewis acid/controlling agent complex and Lewis acid; spraying the reaction medium into a nonsolvent for the polymer; separating the polymer by filtration; or evaporating the volatiles from the reaction medium and then washing with an appropriate solvent to remove any remaining complex and diluent from the polymer.

In recovery of the polymer from the reaction mixture, the reaction mixture can be liquified, if desired by the method described in European Published Patent Application No. 0173408, the disclosure of which is incorporated herein by reference.

EXAMPLE 1

Preparation of a polymer containing the repeat unit

—Ph—O—Ph—CO—Ph—O—Ph—CO—
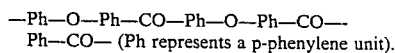
Ph—CO— (Ph represents a p-phenylene unit).

To a 500 ml reaction flask equipped with a stirrer, having been purged with nitrogen, was added 70 mls of dichloromethane which was then cooled to −25° C. To the cold dichloromethane was added 108 g (0.81 M) of anhydrous aluminium trichloride. After allowing the temperature of the slurry to fall back to −25° C. 21 g (0.28 M) of propionic acid was added at a rate that did not allow the temperature of the contents of the reaction flask to rise above, −15° C. After allowing the contents of the flask to cool back to −20° C. 54.8177 g (0.1496 M) of 4,4'-diphenoxybenzophenone was added and washed into the flask with 40 mls of fresh dichloromethane. This was followed by the addition of 30 g (0.1478 M) of terephthaloyl chloride which was also washed into the flask with 40 mls of fresh dichloromethane. Finally 0.5193 g (3.69×10$^{-3}$ M) of benloromethane. zoyl chloride was added and washed in with 10 mls of fresh dichloromethane. Whilst stirring the temperature of the reaction flask was allowed to rise to +10° C. over 2 hours and then further raised to +15° C. and maintained for 6 hours. Polymerisation was complete and the reaction mass was an orange/yellow gel.

The mass was chopped up into small pieces and the polymer decomplexed by breaking it up in a high speed blendor in 4N HCl. After blending the polymer was filtered off as a white filerous solid. The solid was transferred to a 2 liter reaction flask containing 1.5 liters of 4N HCl and left stirring for 24 hours. The polymer was then filtered off and transferred to another flask containing 4N methanolic HCl and stirred for 6 hours. The polymer was filtered again and then placed in 1N methanolic HCl and refluxed for 6 hours. After filtering off the polymer it was washed with 4×500 mls of fresh methanol and then refluxed in 1.5 liters of water containing 10 mls of 0.88 ammonia for 12 hours. The polymer was filtered off and washed, with slurring, with 4×500 mls of distilled water.

The polymer fluff was dried first at 100° C. overnight and then at 200° C. overnight.

The resultant polymer had an inherent viscosity of 1.39 dl/g, as measured as a 0.1% solution in concentrated sulphonic acid. The structure of the polymer was confirmed by $^{13}C$ n.m.r. spectroscopy.

Similar reactions were carried out with different controlling agents and with different amounts of controlling agent based on the amount of acid groups present and with or without a capping agent the results are shown in Table 1.

TABLE 1

| Controlling Agent | | | |
|---|---|---|---|
| Conpound | Amount (per mole of acid chloride groups) | Capping Agent | Inherent Viscosity of Resulting Polymer |
| acetic acid | 1 mol | yes | 1.2 |
| acetic acid | 2 mols | yes | 1.6 |
| acetic acid | 2 mols | no | 2.5 |
| butanoic acid | 2 mols | no | 1.8 |
| trichloroacetic acid | 2 mols | yes | 0.6 |
| trifluoroacetic acid | 2 mols | no | 1.6 |
| succinic acid | 1 mol | yes | 1.5 |
| methane sulphonic acid | 2 mols | no | 0.6 |
| methanol | 2 mols | no | 1.8 |
| ethanol | 1 mol | yes | 1.4 |
| butanol | 1 mol | no | 2.2 |
| butanol | 2 mols | no | 2.6 |
| $CH_3CH_2COONa$ | 1 mol | yes | 1.0 |
| $(CH_3CH_2O)_3Al$ | 2 mols | no | 0.7 |
| $(CH_3COO)_3Al$ | 2 mols | yes | 1.5 |

Samples of polymers prepared using acetic acid and n-butanol when held at 400° C. for 30 minutes in a press retained the same inherent viscosity ±0.02.

EXAMPLE 2

Preparation of a polymer containing the repeat unit

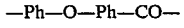

(Ph represents a p-phenylene unit)

To a 250 ml reaction flask, equipped with a stirrer and having been purged with nitrogen, was added 100 mls of dichloromethane. After cooling to −25° C. 28.5 g (0.214 Mols) of anhydrous aluminium trichloride was added. After allowing the slurry to cool back to −25° C. 3.18 g (0.043 Mols) of n-butanol was added at a rate such that the temperature of the flask did not rise above −15° C. After allowing the mixture to cool back to −20° C. 20 g (0.086 Mols) of p-phenoxybenzoyl chloride was added, keeping the temperature below −15° C., and washed into the flask 20 mls of fresh dichloromethane. After the addition was complete the temperature of the mixture was raised to +15° C. During this time 0.1575 g (4.298×10⁻⁴ Mols) of 4,4'-diphenoxy benzophenone and 0.1208 g (8.594×10⁻⁴ Mols) of benzoyl chloride were added to the reaction flask. The reaction was then maintained at +5° C. for 16 hours. After this period the reaction mass was an orange-brown gel.

The polymer was isolated using a similar method to that described in Example 1.

The polymer thus obtained had an inherent viscosity of 1.04 dl/g as measured in a 0.1% solution of concentrated sulphuric acid.

The structure of the polymer was confirmed by $^{13}C$ n.m.r. spectroscopy.

EXAMPLE 3

Preparation of a polymer containing the repeat unit

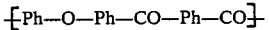

To a 150 ml reaction flask equipped with stirrer, having been purged with nitrogen, was added 50 mls of dichloromethane which was then cooled to −25° C. To the cold dichloromethane was added 13 g (0.0975 M) of anhydrous aluminium chloride. After allowing the temperature of the slurry to fall back to −25° C. 2.90 g (0.0392 M) of butanol was added at a rate that did not allow the temperature of the contents of the reaction flask to rise above −15° C. After allowing the contents of the flask to cool back to −20° C. 4.6979 g (9.984×10⁻³M) of 1,4-bis(4-phenoxybenzoyl) benzene was added and washed into the flask with 10 mls of fresh dichloromethane. This was followed by the addition of 2 g (9.851×10⁻³ M) of terephthaloyl chloride which was also washed into the flask with 10 mls of fresh dichloromethane. Whilst stirring rapidly the temperature of the flask was allowed to rise to +10° C. over 1½hrs and then to 20° C. naturally. The reaction was maintained at 20° C. for 5 hrs. After this time polymerisation was complete and the reaction mass was a fine dispersion. After filtering off the polymer complex particles they were worked up as in example 1.

The resultant polymer had an inerent viscosity of 1.75 dl/g, as measured in a 0.1% solution in 98% sulphuric acid. The structure of the polymer was confirmed by $^{13}C$ n.m.r. spectroscopy.

EXAMPLE 4

Preparation of a polymer containing the repeat unit

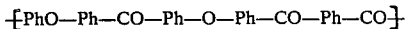

Using the procedure outlined in Example 1 the above polymer was prepared using the reagents specified below.

| | | |
|---|---|---|
| 4,4'-diphenoxybenzophenone | 3.6548 g | (9.974 × 10⁻³ M) |
| Terephthaloyl chloride | 2 g | (9.851 × 10⁻³ M) |
| Aluminium chloride | 7.88 g | (0.059 M) |
| Pentafluorophenol | 3.626 g | (0.0196 M) |
| Dichloromethane | 50 mls | |

The resultant polymer had an inherent viscosity of 0.88 dl/g as measured in a 0.1% solution in 98% sulphuric acid.

EXAMPLE 5

Preparation of a polymer containing the repeat unit

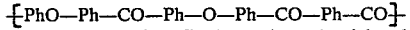

To a 3 liter reaction flask equipped with a high speed stirrer, having been purged with nitrogen, was added 1 liter of dichloromethane which was then cooled to −25° C. To the cold dichloromethane was added 367.58 g (2.757 M) of anhydrous aluminium chloride. After allowing the temperature of the slurry to fall back to −25° C. 111.02 g (0.909 M) of benzoic acid was added at a rate that did not allow the temperature of the contents of the reaction flask to rise above −15° C. After allowing the contents of the flask to cool back to −20° C. 169.55 g (0.4627 M) of 4,4'-diphenoxybenzophenone was added washed into the flask with 150 mls of fresh dichloromethane. This was followed by the addition of 92.28 g (0.4546 M) of terephthaloyl chloride which was also washed into the flask with 150 mls of dichloromethane. Finally 2.3002 g (0.01636 M) of benzoylchloride was added and washed in with 50 mls of dichloromethane. Before allowing the temperature to rise 440 mls of cyclohexane was added to the reaction mixture. Whilst stirring the temperature of the flask was raised to −4° C. and maintained for half an hour, to allow complete mixing. The stirring rate was then increased to maximum and the temperature raised to +15° C. over 1½ hrs and then to 20° C. over 20 mins. The reaction mixture was rapidly stirred and maintained at 20° C. for 3 hrs. After this time the polymer complex was filtered off as fine orange/yellow particles.

The particles were decomplexed in cold 4N HCl, prepared using ice, and soaked at room temperature, with stirring, overnight. After replacing the 4N HCl decomplexing mixture with fresh 4N HCl the volatile organic residues were removed by bringing the mixture to reflux, and using a Dean-Stark head. The mixture was refluxed for 8 hrs. The 4N HCl was then replaced with de-ionised water and the mass refluxed for 2-4 hrs. This was repeated once. The de-ionised water was then replaced by ammonia solution (pH 10) and the mass refluxed for 6 hrs. Finally the ammonia solution was replaced by more de-ionised water and the mass refluxed, again this was repeated once.

The plymer was isolated as a fine white powder which was dried in a vacuum oven at 200° C. overnight to give a free-flowing product.

The resultant polymer had an inherent vicosity of 1.16 dl/g as measured in a 0.1% solution in 98% sulphuric acid. The structure of the polymer was confirmed by $^{13}$C n.m.r spectroscopy.

Residual Al content—300 p.p.m.
Residual Cl content—52 p.p.m.

The powder could be compression moulded into tough flexible slabs at 400° C. After maintaining the material at 400° C. for 30 mins it was found that the inherent viscosity, measured as above, was 1.18 dl/g.

Similar results were obtained with the controlling agents biphenyl-4-carboxylic acid, 4-methylbenzoic acid and 4-methylbenzene sulphonic acid.

EXAMPLE 6

To a 1 liter reaction flask equipped with a stirrer and having been purged with nitrogen, was added 180 mls of dichloromethane which was cooled to −20° C. To the cold dichloromethane was added 42.27 g (0.3171 M) of anhydrous aluminium chloride. After allowing the temperature of the slurry to fall back to −20° C. 9.16 g (0.075 M) of benzoic acid was added at a rate that did not allow the temperature of the contents of the reaction flask to rise above −15° C. After allowing the contents of the flask to cool back to −20° C. 13.2278 g (0.03610 M) of 4,4'-diphenoxybenzophenone was added followed by 9.8498 g (0.015 M) of N, N'-bis(4-phenoxyphenyl)-3,3',4,4'-benzophenonetetracarboxylic di-imide, each being washed into the flask with 25 mls of dichloromethane. This was followed by the addition of 10.151 g (0.05 M) of terephthaloyl chloride which was washed into the flask with 20 mls of dichloromethane. Finally 0.3093 g (0.0022 M) of benzoyl chloride was added and washed in with 10 mls of dichloromethane. Whilst stirring the temperature of the reaction flask was raised to 0° C. over 1 hour. The mixture was then rapidly stirred and the temperature raised to 20° C. over 2 hrs, and maintained for 4 hrs.

The polymer complex was worked up by blending the complex in cold (−10° C.) methanol. The pale yellow product was soaked in methanol for 24 hrs followed by refluxing in fresh methanol for 8 hrs. The polymer was dried at 220° C. in a vacuum oven overnight.

The resultant polymer had an inherent viscosity of 0.67 dl/g, as measured in a 0.1% solution in 98% sulphuric acid. The $^{13}$C n.m.r. spectrum of the polymer showed the presence of the following structures:

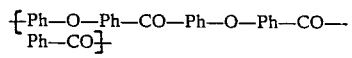

and

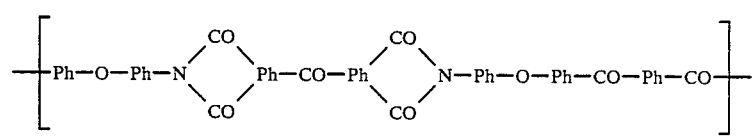

EXAMPLE 7

Example 6 was repeated with the following reagents.

| | | |
|---|---|---|
| 4,4'-diphenoxybenzophenone | 6.6230 g | (0.01808 M) |
| N,N'—bis(phenoxyphenyl-3,3', 4,4'-benzophenonetetra-carboxylic di-imide | 4.9249 g | (0.0075 M) |
| Terephthaloyl chloride | 5.0755 g | (0.025 M) |
| Benzoyl chloride | 0.1617 g | (0.00115 M) |
| Dimethylformamide | 3.65 g | (0.05 M) |
| Benzoic acid | 3.05 g | (0.025 M) |
| Aluminium chloride | 26.65 g | (0.1999 M) |
| Dichloromethane | 125 mls | |

The resultant polymer had and inherent viscosity of 1.18 dl/g as measured in a 0.1% solution in 98% sulphuric acid.

EXAMPLE 8

Preparation of a polymer containing the repeat unit

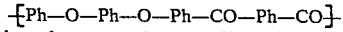

Using the procedure outlined in Example 1 the above polymer was prepared using the reagents specified below.

| | | |
|---|---|---|
| 4,4'-diphenoxybenzene | 5.5980 g | (0.02134 M) |
| Terephthaloyl chloride | 4.3327 g | (0.02134 M) |
| Aluminium chloride | 12.55 g | (0.09412 M) |
| Propionic acid | 3.16 g | (0.04268 M) |
| Dichloromethane | 60 mls | |

The resultant polymer had an inherent viscosity of 1.96 dl/g as measured in a 0.1% solution in 98% sulphuric acid.

EXAMPLE 9

Preparation of a polymer containing the repeat unit

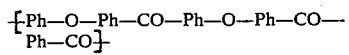

Using the procedure outlined in Example 1 the above polymer was prepared using the reagents specified below.

| | | |
|---|---|---|
| 4,4'-diphenoxybenzophenone | 3.6094 g | (9.851 × 10⁻³ M) |
| Terephthaloyl chloride | 2 g | (9.851 × 10⁻³ M) |
| Water | 0.7 g | (0.039 M) |
| Aluminium Chloride | 10.1 g | (0.0757 M) |

The resultant polymer had an inherent viscosity of 2.13 dl/g as measured in a 0.1% solution in 98% sulphuric acid.

EXAMPLE 10

To a 6 liter jacketed reaction vessel, having been purged with nitrogen and fitted with a bottom outlet valve, baffels, a multiple stirrer assembly and a high speed stirrer motor (capable of stirring at 1000 r.p.m.) was added 1043 mls of cyclohexane and 2131 mls of dichloromethane. The solvent mixture was cooled to $-25°$ C. and then 951.39 g (7.14 M) of anhydrous aluminium chloride added. Having allowed the temperature of the slurry to fall to $-25°$ C., 287.34 g (2.35 M) of benzoic acid was added at such a rate as to keep the temperature in the reaction vessel below $-15°$ C. After cooling back to $-25°$ C., 438.84 g (1.1977 M) of 4,4''-diphenoxybenzophenone was added, again keeping the temperature in the vessel below $-15°$ C. Residual 4,4'-diphenoxybenzophenone was washed into the vessel with 500 mls of dichloromethane. At $-15°$ C., 238.85 g (1.1765 M) of terephthaloyl chloride was added and washed into the vessel with 450 mls of dichloromethane. Finally 5.9536 g (0.04235 M) of benzoyl chloride was added and washed into the vessel with 50 mls of dichloromethane. Whilst stirring, the temperature in the reaction vessel was raised to $+10°$ C. over 2 hours. Also during this time the speed of the stirrer was increased from 350 r.p.m. to 1000 r.p.m. such that when the temperature in the vessel reached $-5°$ C., 1000 r.p.m. was achieved. This stirring rate was maintained throughout the remainder of the experiment. A temperature of $+10°$ C. was maintained from 1 hour and then increased to $20°$ C. over 1 hour and maintained for 3 hours. Polymerisation was then complete and the reaction mass was an orange/yellow mobile milk. The reaction products were discharged into 10 liters of 4N HCl at $-20°$ C., achieved by preparing the acid solution using ice. After stirring for 3 hours the polymer powder was filtered and returned to 5 liters of 1N HCl and stirred overnight. The polymer slurry was then brought to reflux and any remaining dichloromethane and cyclohexane removed. Whilst hot, the polymer powder was filtered and returned to 5 liters of de-ionised water and brought to reflux. After 4 hours the polymer powder was filtered hot and returned to a further 5 liters of fresh de-ionised water and refluxed for 4 hours. After a further hot filtration the polymer powder was returned to 5 liters of de-ionised water and refluxed for 1 hour followed by a final filtration. The filter cake was washed with 3×3 liters of hot deionised water and sucked dry. The polymer powder was dried first at 100° C. overnight and then at 200° C. for 12 hours. The yield of polymer powder was 550 g.

The resultant polymer powder, with an average particle size of 50 microns, had an inherent viscosity of 1.40 dl/g, as measured as a 0.1% solution in concentrated sulphuric acid. The structure of the polymer was confirmed by $^{13}C$ n.m.r. spectroscopy to be similar to that of Example 1.

I claim:

1. A method of preparing a poly(arylene ether ketone) having the repeat unit:

where each Ar is independently a substituted or unsubstituted phenylene moiety or a substituted or unsubstituted polynuclear moiety, aromatic carbon atoms of which are bonded directly to the —O— or —CO— groups, which comprises polymerising a monomer system comprising (I) phosgene or an aromatic or aliphatic diacid dihalide monomer and a polynuclear aromatic comonomer having two activated hydrogens or (II) a self-polymerising polynuclear aromatic monomer containing both an acid halide group and an active hydrogen atom, in a reaction medium comprising:
(A) a Lewis acid;
(B) a controlling agent comprising:
   (i) $R(OX)_a$ or added water which must be present in the reaction medium together with the Lewis acid before any monomer containing acid halide groups is added,
   (ii) $R(COOX)_a$,
   (iii) $R(SO_3X)_a$, or
   (iv) $(RO)_b Y$, which, if the Y—O linkage(s) are reactive to acid halide groups, must be present in the reaction medium together with the Lewis Acid before any monomer containing acid halide groups is added,
   where
   R is a monovalent or polyvalent organic group compatible with the monomer(s) and the other components of the reaction medium,
   each X independently is a hydrogen atom or a monovalent metal atom,
   each a independently is 1 or 2,
   Y is a multivalent metal atom, and
   b is an integer equal to the valency of Y; and
(C) optionally a non-protic diluent;
the various components being present in such proportions and the polymerisation being conducted under such reaction conditions that a thermally stable, substantially linear poly(arylene ether ketone) substantially free of pendant groups resulting from ortho substitution of para-linked aromatic rings in the polymer backbone is obtained *either* in a dispersed state, in which case the group R of the controlling agent (B) has fewer than 8 aliphatic carbon atoms directly bonded to one another, *or* in a solution or gel state.

2. A method of producing a poly(arylene ether ketone) which comprises polymerizing a monomer system comprising:
(I)
   (i) phosgene or an aromatic or aliphatic diacid dihalide monomer and:
   (ii) a polynuclear aromatic comonomer comprising:
      (a) H—Ar—O—Ar—H
      (b) H—(Ar—O)$_n$—Ar—H wherein n is 2 or 3
      (c) H—Ar—O—Ar—(CO—Ar—O—$^{Ar}$)$_m$—H wherein m is 1, 2 or 3 or
      (d) H—(Ar—O)$_n$—Ar—CO—Ar—(O—Ar)$_m$—H wherein m is 1, 2 or 3, and n is 2 or 3 or
(II) a self-polymerising acid halide monomer of the formula H—Ar—O—[(Ar—CO)$_p$—(O—Ar)$_q$—(Ar—CO)$_r$—]$_k$—Ar—CO—Z wherein Z is halogen, k is 0, 1 or 2, p is 1 or 2, q is 0, 1 or 2 and r is 0, 1 or 2; or (III) a self-polymerising acid halide monomer of the formula:

H—(Ar—O)$_n$—Ar—Y wherein n is 2 or 3 and Y is CO—Z or CO—Ar—CO—Z; where Z is halogen; wherein each Ar is independently selected from substituted or unsubstituted phenylene, and substituted and unsubstituted polynuclear aromatic moieties free of ketone carbonyl and ether oxygen groups;

in a reaction medium comprising (A) a Lewis acid in an amount of about one equivalent per equivalent of carbonyl groups present in the monomer system plus about one equivalent per equivalent of controlling agent, plus an amount effective to act as a catalyst for the polymerisation;

(B) a controlling agent, in an amount from 0.25 to 4 equivalents per equivalent of acid halide groups present in the monomer system, comprising:

(i) R(OX)$_a$ or added water which must be present in the reaction medium together with the Lewis acid before any monomer containing acid halide group is added, (ii) R(COOX)$_a$, (iii) R(SO$_3$X)$_a$, or (iv) (RO)$_b$Y, which, if the Y—O linkage(s) are reactive to acid halide groups, must be present in the reaction medium together with the Lewis Acid before any monomer containing acid halide groups is added, where R is an organic group compatible with with the monomer(s) and the other components of the reaction medium and, when the poly (arylene ether ketone) is produced in a dispersed state, has fewer than 8 aliphatic carbon atoms directly bonded to one another, each X independently is a hydrogen atom or atom or a monovalent metal atom, each a independently is 1 or 2, Y is a multivalent metal atom; and b is an integer equal to the valency of Y; and (C) a non-protic diluent in an amount from 0 to about 93% by weight, based on the weight of the total reaction mixture.

3. A method according to claim 1 or 2 wherein the controlling agent is an alcohol, carboxylic acid or organic metal oxide.

4. A method according to claim 1 or 2 wherein R is an alkyl group, preferably an n-alkyl group.

5. A method according to claim 1 or 2, wherein the controlling agent is an n-alkanol, preferably n-butanol.

6. A method according to claim 1 or 2, wherein R is an aryl group preferably a phenyl group.

7. A method according to claim 1 or 2, wherein the controlling agent is an aryl carboxylic acid, preferably benzoic acid.

8. A method according to claim 1 or 2, wherein the controlling agent molecule contains fewer than 8 aliphatic carbon atoms directly bonded to one another.

9. A method according to claim 1 or 2, wherein the amount of controlling agent present in the reaction medium is between 0.1 and 4, preferably between 0.5 and 4, equivalents per equivalent of acid halide groups present in the monomer system.

10. A method according to claim 1 or 2, wherein the Lewis acid is selected from aluminium trichloride, boron trichloride, aluminium tribromide, titanium tetrachloride, antimony pentachloride, ferric chloride, gallium trichloride, and molybdenum penta-chloride.

11. A method according to claim 1 or 2, wherein the Lewis acid is aluminium trichloride.

12. A method according to claim 1 or 2, wherein said polymerisation is carried out in the presence of a non-protic dilutent.

13. A method according to claim 1 or 2, wherein said diluent has a dielectric constant of at least 2.0 preferably from 4.0 to 25, at 24° C.

14. A method according to claim 1 or 2, wherein the monomer system comprises p-phenoxybenzoyl chloride.

15. A method according to claim 1 or 2, wherein the monomer system comprises 1,4-diphenoxybenzene and terephthaloyl chloride.

16. A method according to claim 1 or 2, wherein the monomer system comprises 4,4'-diphenoxybenzophenone and phosgene or terephthaloyl chloride.

17. A method according to claim 1 or 2, wherein the monomer system comprises diphenyl ether and phosgene.

18. A method according to claim 1 or 2, wherein said monomer system comprises 1,4-diphenoxybenzene and phosgene.

19. A method according to claim 1 or 2, wherein a capping agent is added to the reaction medium.

20. A method according to claim 1 or 2, wherein both a nucleophilic and an electrophilic capping agent are added to the reaction medium.

21. A method according to claim 1 or 2, wherein the polymerisation is conducted at a temperature in the range from −30° C. to +25° C.

22. A method according to claim 1 or 2, wherein the controlling agent is selected to produce a dispersion of the poly(arylene ether ketone).

* * * * *